M. Ormsbee.
Silk Winder.

Nº 14,969.  Patented May 27, 1856.

UNITED STATES PATENT OFFICE.

MARCUS ORMSBEE, OF BOSTON, MASSACHUSETTS.

WINDING THREAD FROM SKEINS.

Specification of Letters Patent No. 14,969, dated May 27, 1856.

*To all whom it may concern:*

Be it known that I, MARCUS ORMSBEE, of Boston, in the county of Suffolk and State of Massachusetts, have invented a new and useful Instrument for the Purpose of Winding Silk and Cotton, of which the following is a full, clear, and exact description, reference being had to the annexed drawings, making part of this specification, in which—

Figure 1:
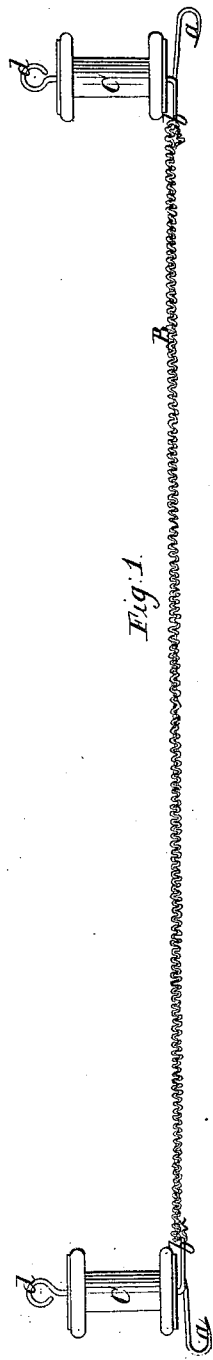
Figure 2:
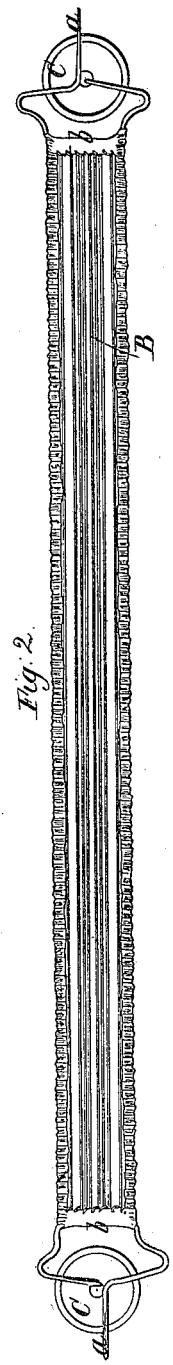

Figure 1, is a front view; Fig. 2, a view from beneath.

To enable others skilled in the art to understand my invention I will proceed to describe the manner in which I have carried it out.

In the accompanying drawings, $a$, is a hook having an eye $b$, and an upright wire $d$, attached thereto; to the eyes of two hooks thus constructed, is attached an elastic band or strap B, which may be more or less distended for the purpose of keeping the hooks at a greater or less distance apart. Each of the upright wires $d$, carries a spool C, upon which the skein of silk or cotton to be wound is placed. The hooks are to be caught into the dress on the knees and by separating the knees the spools are placed at the exact distance apart required to tighten the skein, which may then be wound without difficulty.

What I claim as my invention and desire to secure by Letters Patent is—

The arrangement of the hooks $a$, the spools C, and the elastic strap B, operating in the manner substantially as herein set forth.

MARCUS ORMSBEE.

Witnesses:
SAM. COOPER,
P. E. TESCHEMACHER.